United States Patent [19]
Penicaut

[11] Patent Number: 5,175,455
[45] Date of Patent: Dec. 29, 1992

[54] PERMANENT MAGNET LINEAR DOOR MOTOR

[75] Inventor: Alain M. R. Penicaut, Arcadia Gardens, Singapore

[73] Assignee: Otis Elevator Company, Farmington, Conn.

[21] Appl. No.: 606,794

[22] Filed: Oct. 31, 1990

[51] Int. Cl.[5] .................................. H02K 41/00
[52] U.S. Cl. ................................ 310/12; 318/135
[58] Field of Search ............... 310/12, 13, 68 B; 318/13 J, 34, 38; 104/281, 282, 284, 120, 118

[56] References Cited

U.S. PATENT DOCUMENTS

| | | | |
|---|---|---|---|
| 2,303,263 | 11/1942 | Fisher | 172/290 |
| 2,365,632 | 12/1944 | Fisher | 172/290 |
| 3,771,462 | 11/1973 | Barthalon et al. | 104/148 |
| 4,329,636 | 5/1982 | Uchida et al. | 310/68 R |
| 4,623,806 | 11/1986 | Yoshikawa | 310/12 |
| 4,707,642 | 11/1987 | Sorimachi et al. | 318/115 X |
| 4,803,387 | 2/1989 | Seider | 310/12 |

FOREIGN PATENT DOCUMENTS 2029462 4/1972 Fed. Rep. of Germany ............ 41/2

OTHER PUBLICATIONS

French Search Report dated Oct. 19, 1990 (2 pages).

Primary Examiner—William H. Beha, Jr.
Assistant Examiner—Ed To
Attorney, Agent, or Firm—Lloyd D. Doigan

[57] ABSTRACT

A linear motor comprises: a first module having several aligned permanent magnets separated by gaps of fixed length, the magnets being disposed so that their North and South poles alternate in plane; a second module formed of one or more pairs of U-shaped electromagnets, the electromagnets having parallel legs and being separated from an adjacent electromagnet by a width equal to that of the gaps between the permanent electromagnets disposed on the fixed module, the electromagnet being connected such that when one of the electromagnets is in register with a gap between two permanent magnets, the other is in register with a third permanent magnet; and, a means for supplying the electromagnets with power as a function of the position of the electromagnet, such that each electromagnet; has a given polarity between a first point beyond register with a permanent magnet by a certain distance and a second point before register with a next permanent magnet by a certain distance, has no power supplied between the second point and a third point when the electromagnet passes beyond the next permanent magnet, and has a reverse polarity at and beyond the third point etc.

4 Claims, 3 Drawing Sheets

U.S. Patent    Dec. 29, 1992    Sheet 1 of 3    5,175,455
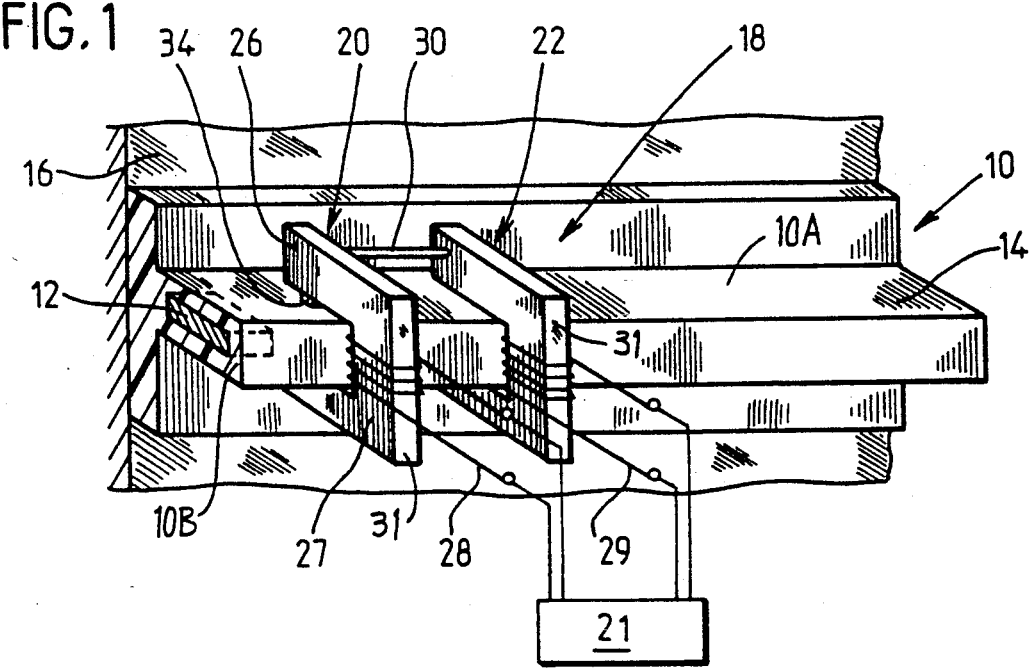
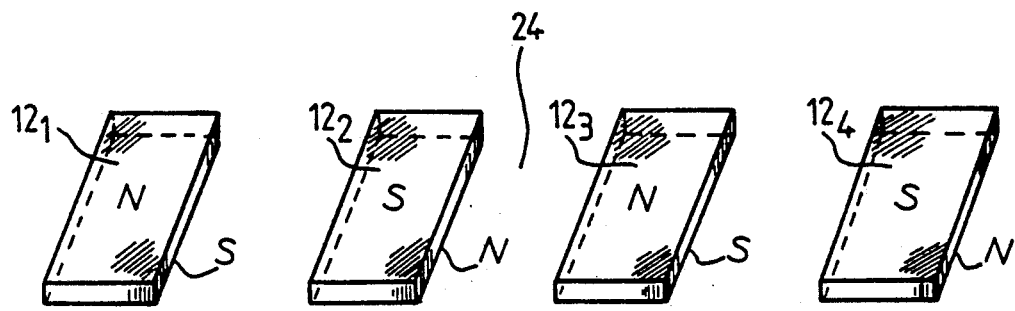

PERMANENT MAGNET LINEAR DOOR MOTOR

The present invention relates to linear motors and more particularly to a linear motor for actuating elevator doors.

BACKGROUND ART

Linear motors are known to actuate elevators doors. For instance, U.S. Pat. No. 2,303,263 and U.S. Pat. No. 2,365,632, both to Fisher, each show a linear motor which opens and closes elevator doors.

Each linear motor comprises: a rectilinear stator having equal length magnetic portions alternating with non-magnetic portions; several electromagnets spaced apart and disposed and moveable longitudinally along the stator, the length of each electromagnet being equal to the length of one of the portions, and the distance between two successive electromagnets being one and two-thirds thirds times the length of an electromagnet; and, a means responsive to the relative movement of the electromagnets for energizing the electromagnets successively in sequence so that the movement occurs in one direction, or in reverse sequence so that the movement occurs in an opposite direction.

The motors have the following drawbacks: the relay system for providing power to the electromagnets is complicated, cumbersome and heavy; the motor operates at low efficiency because each electromagnet is powered, and is therefore driving, for a third of the time, whereas the other two-thirds of the time, the electromagnet is passive, the result of which is that only the electromagnet supplied with power is working and must pull the other two electromagnets; and at least three electromagnets must be used so as to obtain smooth driving of the doors, which leads to a relatively heavy and bulky motor.

DISCLOSURE OF THE INVENTION

It is an object of the invention to provide an efficient permanent magnet linear motor.

It is a further object of the invention to have a permanent magnet linear motor which is easy to control.

It is a further object of the invention to have a relatively compact, lightweight motor.

According to the invention, a permanent magnet linear motor comprises:

a first module having several aligned permanent magnets separated by gaps of fixed length, the magnets being disposed so that their North and South poles alternate in a plane;

a second module formed of at least one pair of U-shaped electromagnets, each electromagnet having parallel legs and being separated from an adjacent electromagnet by a width equal to that of the gaps between the permanent magnets of the first module, the electromagnets being connected such that when one of the electromagnets is in register with a gap between two permanent magnets, the other is in register with a third permanent magnet;

a means for detecting the position of one of the electromagnets relative to the permanent magnets; and, a means for supplying the electromagnets with power as a function of the position of the electromagnet, such that each electromagnet: has a given polarity between a first point beyond register with a permanent magnet by a certain distance and a second point before register with a next permanent magnet by a certain distance, is not powered between the second point and a third point when the electromagnet passes beyond the next permanent magnet, and has a reverse polarity at and beyond the third point etc.

According to a further embodiment of the present invention, the linear motor comprises:

a first module having several aligned permanent magnets separated by gaps of fixed length, the magnets being disposed so that their North and South poles alternate in a plane;

A second module formed of one or more pairs of U-shaped electromagnets, each electromagnet having parallel legs and being separated from an adjacent electromagnet by a width equal to that of the gaps between the permanent magnets of the first module, the electromagnets being connected such that when one of the electromagnets is in register with a gap between two permanent magnets, the other is in register with a third permanent magnet, each electromagnet having a given polarity between a first point beyond register with a permanent magnet by a certain distance and a second point before register with a next permanent magnet by a certain distance, not being powered between the second point and a third point when the electromagnet passes beyond the next permanent magnet, and further having a reverse polarity at and beyond the third point etc.

The motor of the invention has better efficiency than those of the prior art because the permanent magnets exert attractive and repulsive forces for driving the mobile module at all times. Electromagnetic forces are exerted on the two electromagnets at all times, except for the short period of time between the second and third moments during which time one of the electromagnets is working.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 1 is a perspective view of a preferred embodiment a linear motor of the invention;

FIG. 2 is a perspective view of several permanent magnets as disposed within a fixed portion of a linear motor of FIG. 1;

BEST MODE FOR CARRYING OUT THE INVENTION

Figure 3:
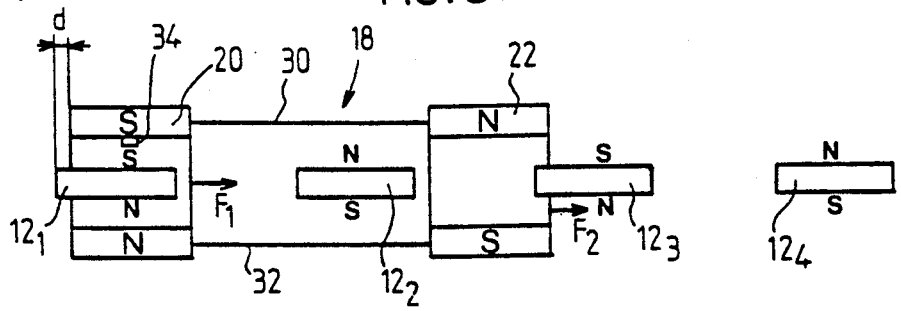
FIGS. 3-7 show schematic views of successive positions of a moveable portion of the linear motor of FIG. 1.
Figure 4:
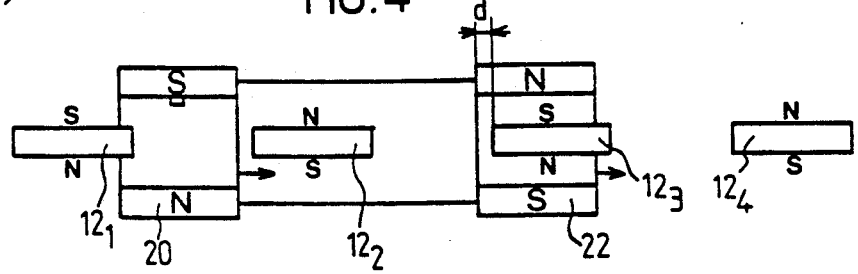

Referring 1 and 2, the linear motor is comprised of: a rectilinear fixed module 10 formed of a succession of fixed permanent magnets $12_1, 12_2, 12_3, 12_4,...$ disposed in a plane and held in position by a carrier bar 14 having a T-shaped cross section; a mobile module 18 formed by two electromagnets 20, 22 rigidly secured together, as will be discussed hereinafter and a control means 21. The carrier bar 14 is constructed of a non-magnetic material and is fixed to a support 16. As shown in FIG. 1, the first module 10 has opposite sides 10A, 10B which face in directions generally away from one another. The control means 21, as one of ordinary skill in the art will readily appreciate, is comprised of an electrical or electronic controller and a power supply (not shown).

The North poles of the permanent magnets 12 are alternated upwardly and downwardly as shown in the FIG. 2. Thus, the first, third, fifth etc. (not shown) magnets 12 have North poles directed upwardly whereas the second, fourth, sixth etc. (not shown) magnets have their North pole directed downwardly. The magnets are separated by gaps 24 of fixed length.

Each electromagnet 20, 22 is comprised of a U-shaped core having parallel legs 26, 27 attached to each other by a connecting portion 31. The parallel legs overlap the carrier bar 14. Windings 28, 29 are disposed about the connecting portion 31 and are energized by the control means 21. The electromagnets are rigidly connected by two rods 30, 32. The rods maintain the electromagnets in parallel and apart at a distance such that, when one electromagnet is opposite a permanent magnet, the other is in register with a gap 24 which separates two magnets 12.

A Hall effect probe 34 is fixed to one of the electromagnets 20, 22 and communicates with the control means via lead (not shown). The probe measures the magnetic field of the permanent magnets. The probe provides a proportional signal according to which the control means supplies current to the windings 28, 29 of the electromagnets, as will be described in detail hereafter with reference to FIGS. 3-7.

For the sake of discussion, it is assumed that the mobile module 18 is initially in the position illustrated in FIG. 3, electromagnet 20 has just arrived a distance d after the register with the permanent magnet $12_1$, whose polarities are respectively South for its upper face and North for its lower face as shown.

In the initial position, permanent magnet $12_1$ is detected by the Hall effect probe 34 which then emits a signal which is proportional to the field measured to the control means 21. The control means then provides current to the electromagnet 20 such that the upper leg of the electromagnet forms a South pole and a lower leg of the electromagnet forms a North pole. At the same time, current is fed to the electromagnet 22 such that its upper leg is a North pole and its lower leg is a South pole. The like poles of electromagnet 20 and magnet $12_1$ repel each other thereby moving the module 18 to the right, and the opposite poles of electromagnet 22 and magnet $12_3$ attract each other thereby also moving the module to the right.

Figure 8:
FIGS. 8-13 show diagrammatic views of the forces which exerted on the permanent magnets of the linear motor of FIG. 1.

Referring now to FIGS. 8-13, the forces to which the mobile module is subjected are shown. FIG. 8 shows the waveform of the current supplied to electromagnet 20 by the co means 21. It is assumed that the current is constant, which explains the rectangular shape. The waveform (not shown) of current supplied to electromagnet 22 is identical to that of electromagnet 20, but shifted by a length of a magnet.

Figure 9:
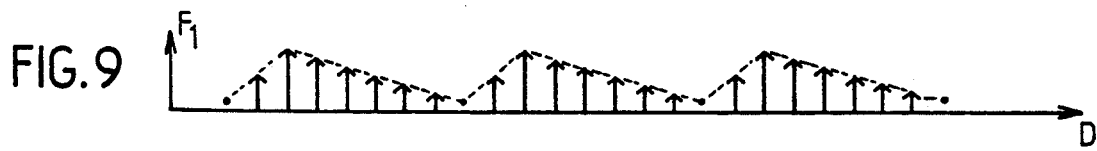
Figure 10:
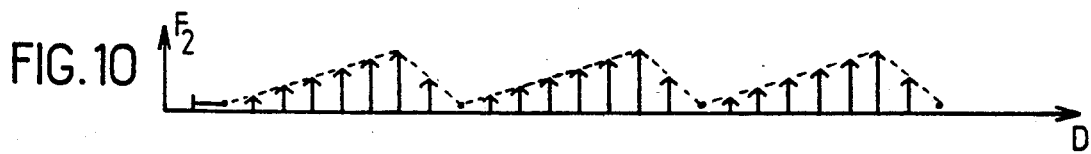

FIG. 9 is a diagram of the amplitude of the repulsion force $F_1$ resulting from the magnetic field, at each position d of the center of electromagnet 20, and due to the proximity of two like poles (e.g., $12_1$ in FIG. 3); FIG. 10 shows the distribution of the attraction force $F_2$ generated by the magnet which follows in the direction of movement (e.g., $12_2$ in FIG. 3).

Figure 11:
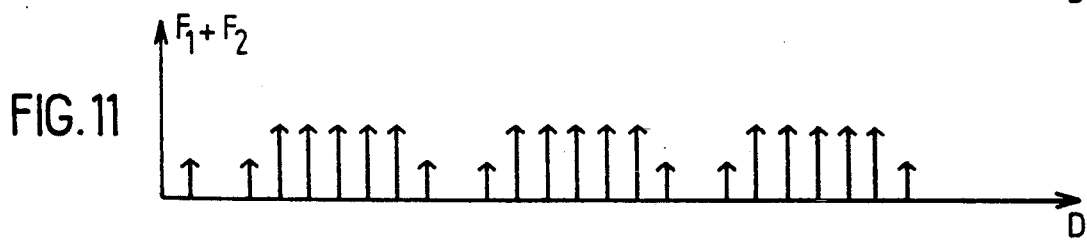

In FIG. 11, the distribution of the resultant force $F_1+F_2$ which is exerted on electromagnet 20 is shown.

Figure 12:
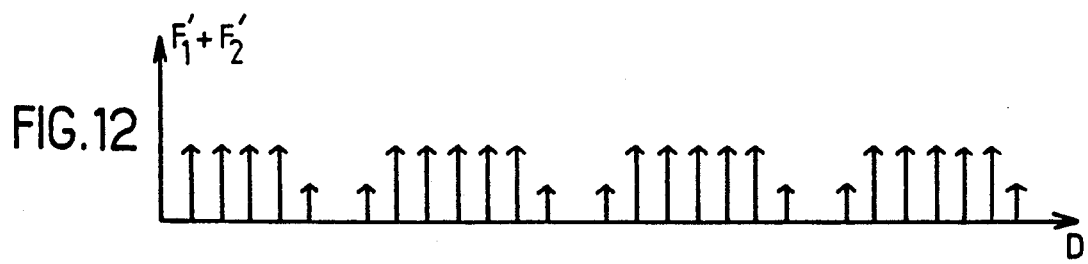

Similarly, FIG. 12 shows the distribution of forces forces $F'_1+F'_2$ acting on the electromagnet 22.

Figure 13:
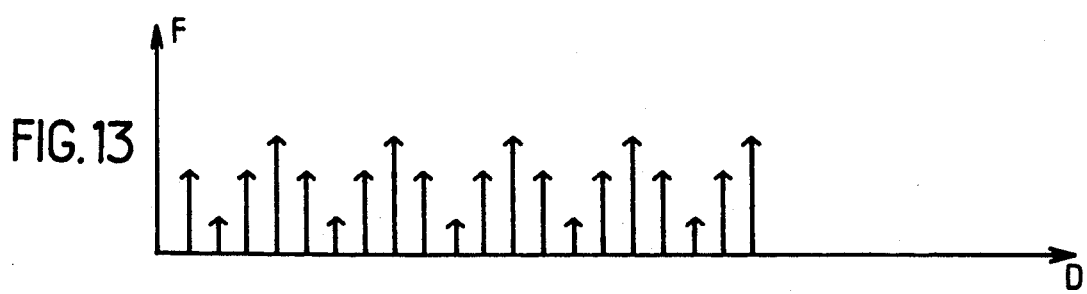

Finally, FIG. 13 gives the total resultant force F exerted on the mobile module 18. force F is never zero. In addition, as one of ordinary skill in the art will readily appreciate, by utilizing a control means which provides current with an appropriate wave form, it is possible to minimize the undulation of the resultant force F so as to obtain an relatively constant driving force. As one of ordinary skill in the art will appreciate, the waveform of the current supplied to the electromagnets may be directly derived from the signals supplied by the Hall effect probe vis-a-vis the distribution of the magnetic fields sensed by the probe.

The mobile module 18 operates as a result of the forces shown in FIGS. 8-13 as described previously. Referring now to FIGS. 3-7, when the mobile module 18 reaches the position illustrated in FIG. 4, i.e. when the electromagnet 22 is at a distance d before register with magnet $12_3$, power to this electromagnet is cut off by the control means. It is inefficient to supply the electromagnet 22 with power beyond this position since the force of attraction which magnet $12_3$ would exert thereon would decrease and become zero at the time when it passes exactly opposite the permanent magnet $12_3$. Despite cutting current to the electromagnet 22, the mobile module 18 continues to move under the action of the repulsive and attractive electromagnetic forces between the permanent magnets $12_1$ and $12_2$, respectively, and the electromagnet 20.

Figure 5:
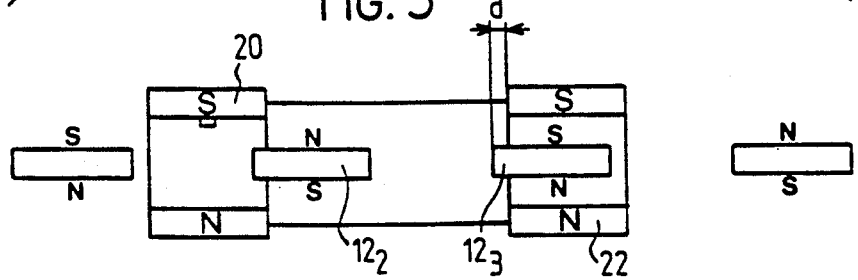

The control means keeps the current off until electromagnet 22 arrives at the position shown in FIG. 5, at a distance d after register with the permanent magnet $12_3$. Power to the electromagnet 22 is then reestablished by the control means but with reverse polarity, namely South for the upper leg and North for the lower leg.

By reasoning similar to the preceding, i.e. due to the attractive forces between electromagnet 20 and magnet $12_2$, and the repulsive forces between electromagnet 22 and magnet $12_3$, one can see that the mobile module 18 moves to the right as before.

Figure 6:
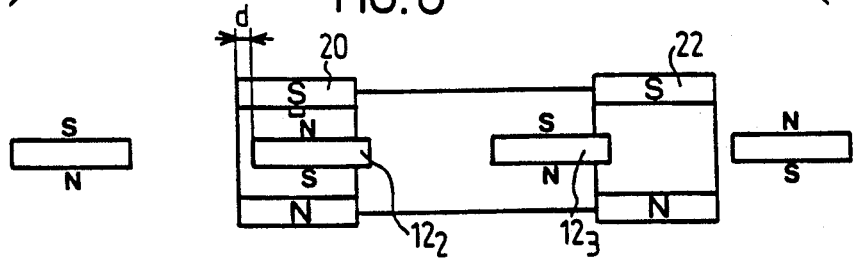
Figure 7:
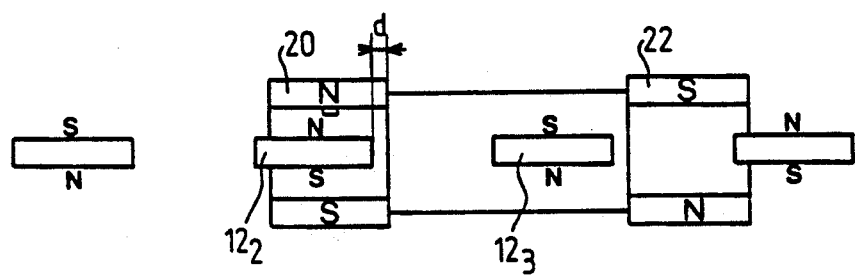

This movement continues without change until the electromagnet 20 has reached the position shown in FIG. 6, where it is at a distance d before register with the permanent magnet $12_2$. Current to electromagnet 20 is then cut off by the control means 21. Current is reestablished when electromagnet 20 reaches the position shown in FIG. 7, where it has gone beyond register with the permanent magnet $12_2$ by the distance d. Movement of the module continues thusly.

Of course if the polarities of the legs of the electromagnets were reversed with respect to the polarities as shown in FIGS. 3-7, movement would take place in the reverse direction.

The linear motor of the invention has numerous advantages and is capable of numerous uses of which only a few will be cited by way of example:

By controlling the magnetizing current, the drive force, and thereby the speed of movement of the mobile module, can be regulated. This control may take place automatically by the control means by comparing the magnetic charge profile seen by the Hall effect probe with a stored typical profile.

Reversal of the magnetizing current causes a braking force if the mobile module is in reverse movement.

The system may even become an energy regenerator if the mobile module is driving. By moving in the magnetic fields of the permanent magnets, the electromagnets generate induced electromotive forces $$\frac{dl}{dt}$$

at the terminals of their windings, φ being the flux embraced by the turns of the electromagnets.

The control means, via the probe, may count the permanent magnets during movement to automatically control stopping of the mobile module and to hold it in a well defined position. For example, when the electromagnet 22 arrives opposite an $n^{th}$ permanent magnet (not shown), at which point stopping of the module has been programmed, the current to electromagnet 22 is maintained and that to electromagnet 20 is cut off. The module will then be in stable equilibrium since any movement caused by an external force on one side or the other of the equilibrium position creates a horizontal component of the electromagnetic force which tends to place the poles of the electromagnet 22 again opposite those of the $n^{th}$ permanent magnet.

Obviously, the accuracy of positioning of the module is directly related to the spacing or pitch of the permanent magnets. In the case of the module with two electromagnets described up to now, the accuracy will be a half pitch, since an electromagnet can stop either opposite a permanent magnet or opposite a gap 24.

In an interesting embodiment, it is possible, by adding several other modules and by staggering the electromagnets by a different fraction of a step, to construct the equivalent of a vernier.

The linear motor according to the invention may be used for driving sliding doors. In this case, the carrier bar 14 which holds the permanent magnets in position is fixed to the lintel of a door (not shown). The electromagnets, whose number may be increased depending on the weight of the doors to be driven, are fixed to the carriage (not shown) of the doors. The control means may be installed on the roof or the lintel.

The linear motor according to the invention, may also be used for driving a counterweight (not shown). The principle is the same as for the above application, only the forces being greater. It is sufficient to increase the power of the motor by multiplying the mobile modules as well as the carrier bars 14. These bars may be fixed end to end and serve as a guide.

We claim:

1. A permanent magnet linear drive motor comprising:
   a rectilinear first module formed of several aligned permanent magnets separated by gaps of fixed length and disposed so that their North and South poles alternate;
   a second module formed of at least one pair of U-shaped electromagnets, each of said electromagnets having parallel legs with a width equal to that of the gaps between the permanent and each electromagnet having its parallel legs disposed on opposite sides of the first module, each pair of electromagnets being rigidly connected by a connection of a length such that when one of the electromagnets is in register with said gap between two permanent magnets, the other is opposite a third permanent magnet, each electromagnet having:
   a first polarity between a first point when, the electromagnet has gone beyond register with a permanent magnet by a certain distance (d) and a second point when the electromagnet arrives at the same distance (d) before register with the next permanent magnet; no power between said second point and a third point when the electromagnet passes beyond said next permanent magnet: and,
   a reverse polarity at said third point.

2. A permanent magnet linear drive motor comprising:
   a rectilinear first module formed of several aligned permanent magnets separated by gaps of fixed length and disposed so that third North and South poles alternate;
   a second module formed of at least one pair of U-shaped electromagnets whose parallel legs have a width equal to that of the gaps between the permanent magnets and are disposed on opposite sides of the first module, each pair of electromagnets being rigidly connected by a connection of a length such that when one of the electromagnets is in register with said gap between two permanent magnets, the other is opposite a third permanent magnet;
   a means (34) for sending a signal indicating a position of an electromagnet relative to a magnet; and,
   a control means (21) for receiving said signal and for controlling a supply of power to said electromagnets (20,22) as a function of said signal, such that said each electromagnet has:
   a first polarity between a first point when, the electromagnet has gone beyond register with a permanent magnet by a certain distance (d) and a second point when the electromagnet arrives at the same distance (d) before register with the next permanent magnet; no power between said second point and a third point when the electromagnet passes beyond said next permanent magnet: and,
   a reverse polarity at said third point.

3. The motor of claim 2, wherein said means for sending a signal comprises:
   a Hall effect probe (34) fixed on one of the electromagnets.

4. The motor of claim 2, further comprising:
   a non-magnetic carrier bar having a T-shaped cross section (14) for supporting said electromagnets.